(12) United States Patent
Barker (10) Patent No.: US 10,761,240 B2
(45) Date of Patent: Sep. 1, 2020

(54) DETERMINING A NOTIONAL SOURCE SIGNATURE OF A BUBBLE

(71) Applicant: PGS Geophysical AS, Oslo (NO)

(72) Inventor: Daniel Martin Lewis Barker, Oslo (NO)

(73) Assignee: PGS Geophysical AS, Olso (NO)

( * ) Notice: Subject to any disclaimer, the term of this patent is extended or adjusted under 35 U.S.C. 154(b) by 263 days.

(21) Appl. No.: 15/822,282

(22) Filed: Nov. 27, 2017

(65) Prior Publication Data

US 2018/0196161 A1 Jul. 12, 2018

Related U.S. Application Data

(60) Provisional application No. 62/443,055, filed on Jan. 6, 2017.

(51) Int. Cl.
| | | |
|---|---|---|
| *G01V 1/38* | (2006.01) | |
| *G01V 13/00* | (2006.01) | |
| *G01V 1/137* | (2006.01) | |
| *G01V 1/36* | (2006.01) | |

(52) U.S. Cl.
CPC .............. *G01V 13/00* (2013.01); *G01V 1/137* (2013.01); *G01V 1/3808* (2013.01); *G01V 1/3861* (2013.01); *G01V 1/36* (2013.01); *G01V 2210/1212* (2013.01); *G01V 2210/1293* (2013.01); *G01V 2210/1423* (2013.01); *G01V 2210/56* (2013.01); *G01V 2210/59* (2013.01)

(58) Field of Classification Search
CPC ...... G01V 13/00; G01V 1/137; G01V 1/3808; G01V 1/3861; G01V 1/36; G01V 2210/1212; G01V 2210/1293; G01V 2210/1423; G01V 2210/56; G01V 2210/59
See application file for complete search history.

(56) References Cited

U.S. PATENT DOCUMENTS

| | | | |
|---|---|---|---|
| 4,476,553 A | | 10/1984 | Ziolkowski et al. |
| 7,440,357 B2 * | | 10/2008 | Hopperstad ............ G01V 1/006 367/41 |
| 2005/0259513 A1 | | 11/2005 | Parkes |
| 2016/0109601 A1 | | 4/2016 | Wisløff et al. |

FOREIGN PATENT DOCUMENTS

| | | |
|---|---|---|
| GB | 2320327 | 6/1998 |
| WO | 9722892 | 6/1997 |

OTHER PUBLICATIONS

Ziolkowski et al., "Marine sesimic sources: QC of wavefield computation from near-field pressure measurements" Geophysical Prospecting, 1997, 45, 611-639 (Year: 1997).*
International Preliminary Report on Patentability for related PCT Application PCT/EP2018/050296, dated Jul. 18, 2019 (19 pgs).
Strandenes, et al., "Signatures From Clustered Airguns"; First Break, vol. 10, No. 8 (Aug. 1992) (pp. 305-312) (8 pgs).

(Continued)

*Primary Examiner* — Krystine E Breier (57) ABSTRACT

A notional source signature of a bubble may be determined. For example, a method for determining a notional source signature of a bubble can include estimating a position of a bubble created by actuation of an impulsive source. A notional source signature of the bubble can be determined based on the estimate.

16 Claims, 5 Drawing Sheets

(56) References Cited

OTHER PUBLICATIONS

Posthumus, "Deghosting Using a Twin Streamer Configuration"; Geophysical Prospecting, vol. 41, (1993) (pp. 267-286) (20 pgs).
International Search Report and Written Opinion for related PCT Application PCT/EP2018/050296, dated Apr. 12, 2018 (28 pgs).
Ziolkowski, et al., "Marine Seismic Sources: QC of Wavefield Computation from Near-Field Pressure Measurements" Geophysical Prospecting, 1997, vol. 45, (pp. 611-639) (29 pgs).
Laws, et al., "An Experimental Comparison of Three Direct Methods of Marine Source Signature Estimation"; Geophysical Prospecting, 1998, vol. 46, (pp. 353-389) (37 pgs).
Hong-Lei, et al., "Modeling of Multi-Depth Slanted Airgun Source for Deghosting"; Applied Geophysics, vol. 11, No. 4, (Dec. 2014) (pp. 405-417) (17 figures) (13 pgs).

\* cited by examiner

DETERMINING A NOTIONAL SOURCE SIGNATURE OF A BUBBLE

CROSS-REFERENCE TO RELATED APPLICATIONS

This application claims priority to U.S. Provisional Application 62/443,055, filed Jan. 6, 2017, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical ocean bottom survey, a marine survey vessel tows one or more sources below the water surface and over a subterranean formation to be surveyed for mineral deposits. Receivers may be located on or near the seafloor. The marine survey vessel typically contains marine survey equipment, such as navigation control, source control, receiver control, and recording equipment. The source control may cause the one or more sources, which can be air guns, marine vibrators, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

DETAILED DESCRIPTION

This disclosure is related generally to the field of marine surveying. For example, this disclosure may have applications in marine surveying, in which one or more impulsive source elements are used to generate wavefields, and receivers (towed or ocean bottom) receive energy generated by the impulsive source elements and affected by the interaction with a subsurface formation. The receivers thereby collect marine survey data, which can be useful in the discovery or extraction of hydrocarbons from subsurface formations.

An example of a seismic source is an impulsive source, such as a compressed air source or air gun. As used herein, a source element is a single source device, such as an air gun. A source unit is a plurality of source elements that are actuated together. A source array is a plurality of source elements or a plurality of source units that may be actuated separately. As used herein, the general term "impulsive source" refers to a source element, source unit, or source array. The pressure variation in water as a function of time caused by an actuation of an impulsive source or, more specifically, the pressure variation in water as a function of time caused by a bubble produced by actuation of the impulsive source is called the "source signature." A source signature can be the source signature of an impulsive source element, impulsive source unit, or impulsive source array. The source signature can be described as a combination of notional source signatures, each notional source signature corresponding to a respective source element or bubble produced by actuation of each source element. The notional source signature can be estimated by modeling a source signature for a respective bubble produced by actuation of a respective source element or by inverting recorded data. The respective source elements of the source unit or the respective bubbles produced by actuation of the source elements may be referred to as notional sources in this context. Therefore the source signature or notional source signature can be referred to as the source signature or notional source signature of the bubble or of the impulsive source element. In at least one embodiment, the combination of notional source signatures is a sum of the notional source signatures. Each notional source signature can be a one-dimensional signature because a notional source is considered to emit the same signal in all directions.

The source element or bubble typically emits additional directive signals in addition to the source signature; however, these additional directive signals can decay faster than the source signature and therefore may not be considered to be part of the source signature. For example, the additional directive signals can decay at a rate such that no part of the additional directive signal is present in the far-field.

The ability to de-ghost seismic data, both on source and receiver sides, has opened up broadband marine seismic data acquisition. This has, in turn, resulted in a desire for an overhaul of the modeling of impulsive sources in order to match increased accuracy requirements. In addition to a desire for more accurate modeling of notional source signatures, deviations in depth, pressure, or subarray separations may be enough to invalidate notional source signatures as modeled in some approaches. Other approaches have included using measured signatures, either extracted from the seismic data where an overall signature associated with an impulsive source may be estimated, or from near-field measurements in the vicinity of the impulsive sources in production, where notional source signatures may be estimated or modeled. The use of such approaches, however, may lead to a desire for greater understanding of the behavior of a bubble released from an impulsive source.

At least one embodiment of the present disclosure can include a combination of estimating a position as a function of time for bubbles created by actuation of impulsive sources, and applying this estimate in order to model notional source signatures from individual bubbles produced by actuation of the sources of an impulsive source array. In at least one embodiment, the position of a bubble caused by actuation of a single impulsive source can be estimated by reducing the variation of individually de-ghosted signatures from separate receivers. To account for movement of any of an impulsive source, a bubble, or a receiver, a plurality of receivers, such as hydrophones, can be used and positioned such that the effect of the motion on the recorded signature as a function of time can be different for each receiver. One example of a difference in the effect of motion on the recorded signature is an amplitude change, which may be due to a change in distance between a receiver and an impulsive source or bubble. Another example of a difference in the effect of motion on the recorded signature is a change in a relationship between a directly propagated signal and the signal reflected at the sea surface (a "ghost reflection"). The change in relationship between a directly propagated signal and the ghost reflection at the sea surface can be determined. In at least one embodiment, the change in relationship includes a timing difference or a relative amplitude difference.

Because the sea surface can be a polarity switching reflector, some receivers can be placed close enough to the impulsive source to make the ghost reflection weak enough (by having a longer travelling distance) compared to the direct signal, such that a removal of the ghost reflection and back-propagation to the impulsive source (referred to herein after as "de-ghosting") is possible. In at least one embodiment, the receivers can be placed far enough from the impulsive source to avoid inclusion of higher order near-field effects or directivity from the impulsive source. For example, a plurality of receivers can be located at a near-range (approximately 5 meters or less from an impulsive source) and at a mid-range (approximately 5-20 meters from an impulsive source). Different receivers can record different signals corresponding to ghost reflections based on their distance from the impulsive source that generated the signal causing the ghost reflection. In at least one embodiment, field measurements, such as acquired bubble-test data, can be used. As used herein, "bubble-test data" includes recorded data regarding the behavior of a bubble after it has been produced by actuation of an impulsive source.

At least one embodiment of the present disclosure includes estimating a position of a bubble created by actuation of an impulsive source and determining a notional source signature of the bubble based on the estimate. The position of the bubble can be estimated as a function of time. Embodiments of the present disclosure can help facilitate various seismic functions including, for example, identifying actuation-by-actuation far-field signatures determined from near-field receivers, improved processing of signatures, and potential softening of impulsive source stability parameters in operation.

As used herein, the singular forms "a", "an", and "the" include singular and plural referents unless the content clearly dictates otherwise. Furthermore, the words "may" and "can" are used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 126 may reference element "26" in FIG. 1, and a similar element may be referenced as 226 in FIG. 2. As will be appreciated, elements shown in the various embodiments herein can be added, exchanged, or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
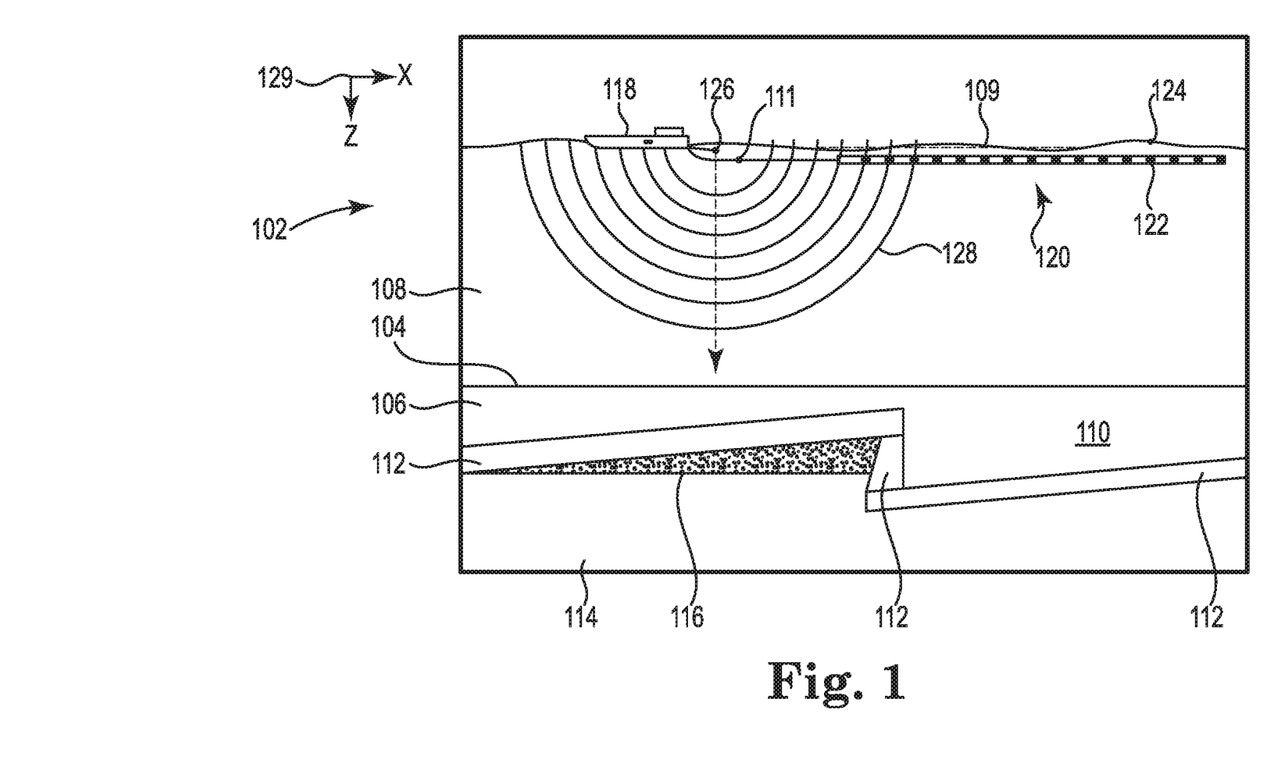
FIG. 1 illustrates an elevation or xz-plane view of marine surveying in which signals are emitted by an impulsive source for recording by receivers.

FIG. 1 illustrates an elevation or xz-plane 129 view of marine surveying in which signals are emitted by an impulsive source 126 for recording by receivers 122. The recording can be used for processing and analysis in order to help characterize the structures and distributions of features and materials underlying the surface of the earth. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can also tow one or more impulsive sources 126 that produce signals as the marine survey vessel 118 and streamers 120 move across the sea surface 109. Impulsive sources 126 and/or streamers 120 may also be towed by other vessels, or may be otherwise disposed in fluid volume 108. For example, receivers may be located on ocean bottom cables or nodes fixed at or near the surface 104, and impulsive sources 126 may also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes.

FIG. 1 shows source energy illustrated as an expanding, spherical signal, illustrated as semicircles of increasing radius centered at the impulsive source 126, representing a down-going wavefield 128, following a signal emitted by the impulsive source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

In at least one embodiment, a near-field receiver 111 can be coupled to the marine survey vessel 118 via cables, which may include power and/or data-transmission lines. The near-field receiver 111 can be a marine seismic receiver such as a hydrophone. Although the near-field receiver 111 is illustrated as being coupled to the marine survey vessel 118 by the same cable as the receiver array 120, embodiments are not so limited. The near-field receiver 111 can be coupled to the marine survey vessel 118 by different cabling. Alternatively, near-field receiver 111 can be any receiver 122 of receiver array 120 that is positioned near impulsive source 126. By way of example, "near-field" can include measurements taken a distance from the impulsive source that is less than about a wavelength of the signal from the impulsive source, "intermediate-field" can include measurements taken a distance from the impulsive source approximately equal to, or on the same order of magnitude as, the wavelength, and "far-field" can include measurements taken a distance from the impulsive source much greater than the wavelength. In some examples, a near-field receiver 111 can be located at a distance of approximately five meters or less from the impulsive source 126, while an intermediate-field receiver (not explicitly illustrated in FIG. 1) can be located at a distance of approximately five to twenty meters from the impulsive source 126. As used herein, a "near-field signal" is a signal received by a near-field receiver.

In at least one embodiment, seismic acquisition can include the use of a source array composed of a plurality of impulsive sources 126 suspended along strings. Each source array can include a combination of single impulsive sources 126 and a plurality of impulsive sources 126. In at least one embodiment, a source array can include between 30 and 40 impulsive sources 126; however embodiments are not so limited, and a source array may include greater than 40 impulsive sources 126, or the source array may include fewer than 30 impulsive sources 126. Strings can be attached by ropes to surface floats and can be towed at a predefined depth below a water surface 109.

Figure 2:
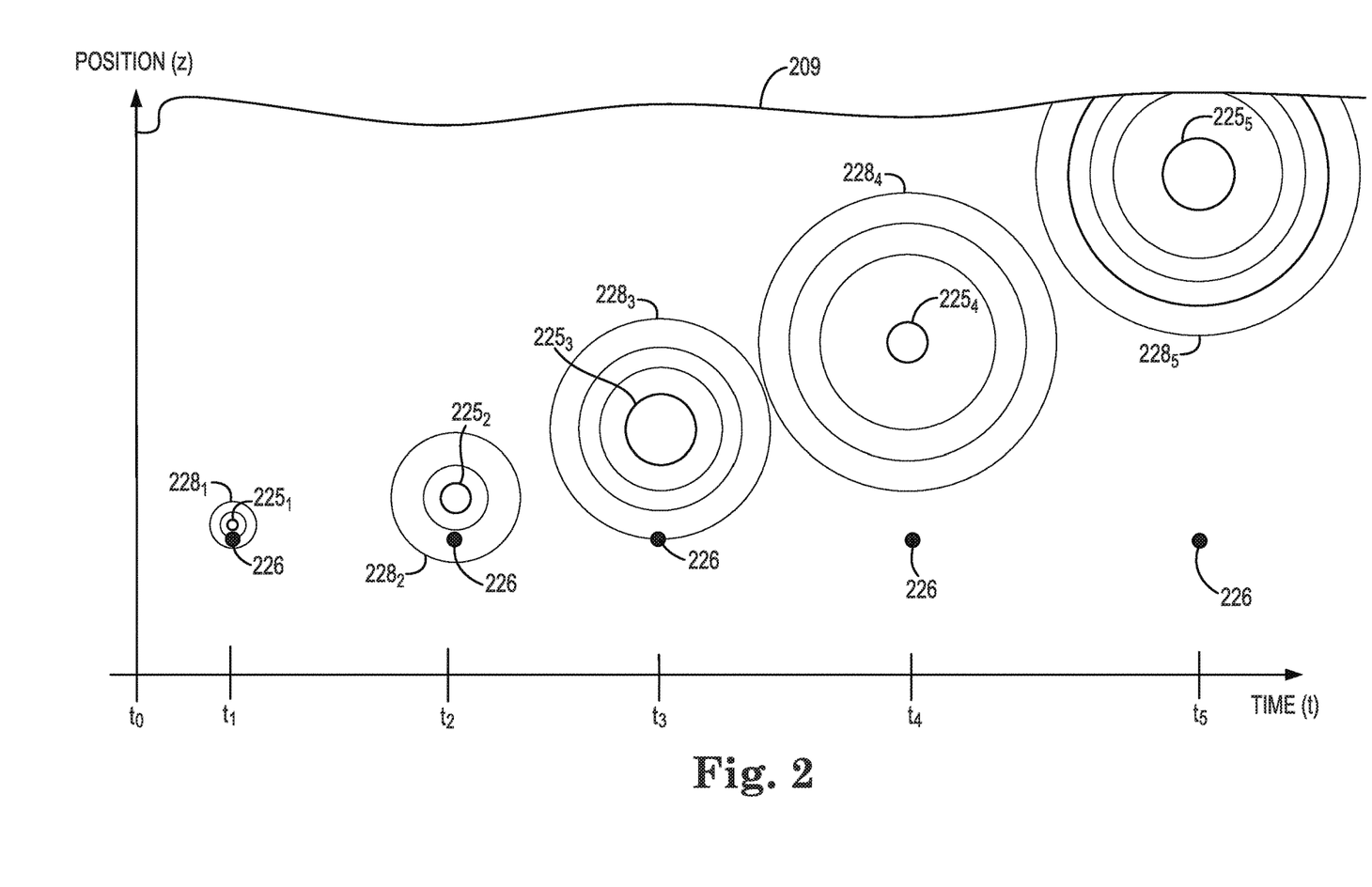
FIG. 2 illustrates creation and propagation of a bubble as a function of time.

When an impulsive source 126, such as an air gun, is actuated, it releases pressurized air into the water. This description uses the term "air" because air is used for most impulsive sources, with the understanding that other types of gases may be used. The emitted impulsive source wavefield can be made of a primary peak, resulting from the sudden release of the high pressure air. This may be followed by a low frequency damped bubble oscillation train of lesser peaks that lasts for approximately a second. Each peak may also be referred to as a bubble peak because each peak corresponds to the expansion and collapse of a bubble. The bubble oscillation can be due to the alternating expansion and collapse of the bubble in the water which can be controlled by the difference between pressure inside the bubble and hydrostatic pressure in the water outside the bubble wall. As the bubble oscillates, it can move upward due to buoyancy, and laterally due to streams in the water or due to proximity to bubbles generated by other impulsive sources FIG. 2 illustrates creation and propagation of a bubble as a function of time. As illustrated in FIG. 2, a time axis extends horizontally, and a position axis extends vertically. An impulsive source 226, bubble 225, and signal 228 are shown at five different times, $t_1$, $t_2$, $t_3$, $t_4$, and $t_5$. At time $t_1$, the impulsive source 226 can be actuated thereby generating a bubble $225_1$, which produces the signal $228_1$. As time increases, the signal 228 propagates and the bubble 225 moves vertically up toward the water surface 209. In at least one embodiment, the bubble 225 can also move horizontally or "into or out of" the page. That is, the motion of the bubble 225 can occur in three spatial dimensions and a time dimension. Although a single impulsive source 226 is shown in FIG. 2 for clarity, in operation a plurality of impulsive sources 226 can be employed in a source array configuration.

The bubble 225 can generate a signal 228, which radiates outward from the bubble 225 in the water. In at least one embodiment, there can be a radial displacement of the water from the center of the bubble 225, and a pressure disturbance can be propagated outward in the water. As time increases, the bubble $225_2$ can expand, for example, from time $t_1$ to time $t_2$ and from time $t_2$ to time $t_3$, and the pressure of the air in the bubble 225 can drop until it falls to that of the surrounding water. In at least one embodiment, the inertia of the bubble 225 can cause the bubble $225_3$ to over-expand as shown at time $t_3$ so that the air pressure in the bubble is less than the hydrostatic pressure of the surrounding water. Then the over-expanded bubble $225_4$ can, as shown at time $t_4$, contract due to the hydrostatic pressure. At time $t_5$, the bubble $225_5$ can again expand and the process of expansion and contraction can continue with the bubble 225 oscillating through multiple cycles. The oscillations of the bubble 225 can produce the signal 228. In addition, as the bubble 225 oscillates, the pressure inside the bubble 225 can vary. In at least one embodiment, the amplitude of the oscillations of the bubble 225 can decrease with time, and the period of oscillation can decrease from one cycle to the next.

Although the signal 228 is shown as being centered on the bubble 225 in FIG. 2, examples are not so limited. For example, due to movement of the bubble 225 toward the water surface 209, the signal 228 can experience a Doppler shift. However, in at least one embodiment, the disparity between the velocity of the bubble 225 and the signal 228 velocity, the Doppler frequency shift may be negligible and may therefore be ignored.

A near-field signature associated with a bubble 225 can be plotted with a horizontal axis representing time and a vertical axis representing pressure. A primary peak may represent an initial build-up and release of a bubble 225 into the water caused by actuation of the impulsive source 226, after which, subsequent peaks may represent a decrease in amplitude with increasing time. The near-field signature may reveal that the pressure after reaching a peak can fall to values below the hydrostatic pressure. An amplitude of oscillation of the bubble 225 can decrease as time passes. A period of oscillation of the bubble 225 may not be constant from one cycle to the next. For example, motion of the bubble 225 may not be simple harmonic motion.

In general, an impulsive source 226 with a larger chamber volume can produce larger peak amplitudes and longer periods of oscillation of the bubble 225 than an impulsive source 226 with a smaller volume. In at least one embodiment, the near-field signature can be influenced by the signals 228 created by other bubbles that may be generated by other impulsive sources actuated simultaneously with the impulsive source 226. When impulsive sources 226 are fired simultaneously, the hydrostatic pressure around each bubble 225 may not be constant. For example, pressure waves radiating from other bubbles can impinge on each bubble 225, modifying the behavior of the bubble 225 and the associated near-field signature. In at least one embodiment, the impulsive sources 226 can be selected with different chamber volumes or may be arranged in a particular manner in order to generate a resulting far-field seismic wave with a short and narrow signature in the vertical-downward direction or with a spectrum that is smooth and broad over a frequency band of interest.

A rise profile of the bubble 225 as it travels through the water toward the water surface 209 is based on characteristics of the bubble 225. The characteristics of the bubble are governed by characteristics of the impulsive source 226, the actuation of which generated the bubble 225. Examples of the characteristics of the impulsive source 226 that can influence the rise profile include the volume of air discharged by the impulsive source 226, a pressure discharged by the impulsive source 226, depth of the impulsive source 226, and whether the impulsive source 226 was actuated independently or as a source unit. Examples of characteristics of the bubble 225 include a rate of expansion and collapse of the bubble, a velocity of the bubble, and a volume of the bubble.

A position of each bubble 225 caused by actuation of impulsive sources 226 in a source array can be determined, for example by measurement or estimation. In at least one embodiment, the position of each bubble 225 can be estimated as a function of time. This process can include repeating an experiment for each possible impulsive source 226 and configuration of impulsive sources 226, or estimating the rise profiles for a subset of bubbles 225 generated by actuation of different impulsive sources 226. For example, the bubble position(s) can be matched with the positions of known theoretical rise profiles of bubbles like those described in relation to Equation (2). In such an example, calibration parameters can be set such that a desired fit is determined for a collection of data. This can allow for estimating rise rates of bubbles 225, and a notional source method can be applied using the changing position of the bubbles 225.

In a notional source method, a signal received by a receiver can be assumed to be a linear combination of a pressure wavefield emitted from each of the individual bubbles 225 together with the corresponding ghost reflections from the water surface 209. Because there may be at least as many receivers as source elements in the array, using the assumptions above can allow for the signals received by the receivers to be back-propagated to the positions of the primary peaks of each of the bubbles 225, which correspond to the impulsive source positions, to get a net signal output associated to each individual impulsive source 226 in the array. The position of the primary peak of a bubble 225 corresponds to the position of the impulsive source 226 at the time it was actuated, or shortly thereafter, to generate the bubble 225. The signal received by the receiver, which contains the interaction effect from the other impulsive sources and the water surface 209, can be a signature, such as a notional source signature, for a particular impulsive source 226 (or bubble 225 generated thereby) within the array. The notional source signatures for the impulsive source(s) 226 (or bubble(s) 225 generated thereby) can then be used to calculate an emitted wavefield at a desired distance and emission angle from a source array.

In at least one embodiment of the present disclosure, characteristics of a bubble 225 can be estimated based on calibration measurements. For example, when acquiring source signatures for calibration purposes, multiple receivers can be positioned such that the recorded signatures can be affected by a ghost reflection in complimentary ways. Because the recorded ghost reflections can depend on impulsive source 226 and receiver position, such as near-field receiver 111 illustrated in FIG. 1, the position of the bubble 225 can be estimated as a function of time from the recorded data. Using the estimated bubble position during a de-ghosting operation can provide an improvement in signature quality compared to using a static de-ghosting approach.

In at least one embodiment, calibration measurements can be used to obtain an estimated depth, z of the bubble, for each recorded time sample $\tau$, for instance (but not limited to) by minimizing the variation of the individually recorded de-ghosted signatures $N_T$, where T is the set of receivers. The estimated depth, z, can be given by Equation 1:

$$z_{Estimate}(\tau) = \min_z [\Sigma_T N_T(\tau)^2 - (\Sigma_T N_T(\tau))^2] \quad (1)$$

The estimated depth determined from Equation 1 may correspond to an estimated position of the bubble 225. For example, calibration measurements corresponding to a volume of the impulsive source 226, pressure discharged by the impulsive source 226, and/or depth of the impulsive source 226 may be used to estimate the position of the bubble 225. In at least one embodiment, the estimated position of the bubble 225 may be applied to marine seismic data (e.g., recorded marine seismic data) to correct the marine seismic data. As an example, errors associated with recorded marine seismic data may be mitigated by applying the estimated position of the bubble 225 thereto, as opposed to approaches in which the position of the bubble is not accounted for, or as in approaches in which bubble position estimates that do not take calibration data into account are used.

In the presence of noise, certain estimates can be used. For example, estimates can be made using time samples having better signal-to-noise ratios as compared to other time samples, interpolation in-between, or matching with a theoretical curve. Time samples that have better signal-to-noise ratios as compared to other time samples can be those time samples that exhibit the strongest amplitudes, which may be time samples that are located as far away from zero-crossings of the curves as possible; however, in at least one embodiment, time samples that have better signal-to-noise ratios as compared to other time samples can be those time samples that are closer to zero-crossings of curves used for an inversion. For example, time samples that are closer to zero-crossings can be used if the recording quality exceeds a particular threshold that allows for an inversion of a signal near the zero-crossings of the curve. An example of a theoretical curve that can be used as an estimate of the depth, z, is given by Equation 2:

$$z = z_0 - \frac{V_{Term}}{\alpha} \ln \cosh \alpha t \quad (2)$$

Equation 2 can be derived from a momentum equation with buoyancy and drag forces. $z_0$ is the depth of the impulsive source. $V_{Term}$ is the terminal velocity of the bubble 225 and a is a factor determining how fast terminal velocity is reached. Both can depend on a representative volume of the bubble 225, area of the bubble 225, drag coefficient associated with the bubble 225, or a mass associated with the bubble 225. In at least one embodiment, the drag coefficient and mass terms can be calibrated to fit the depth estimates, while the volume and area can depend on a volume of compressed air associated with the impulsive source 226, actuating pressure of the impulsive source 226, a depth of the impulsive source 226, or temperature. The temperature may be the temperature of the air or water. In at least one embodiment of the present disclosure, the equilibrium volume can be used as a value for a representative volume. However, other theoretical curves and representative volumes can be used.

Figure 3:
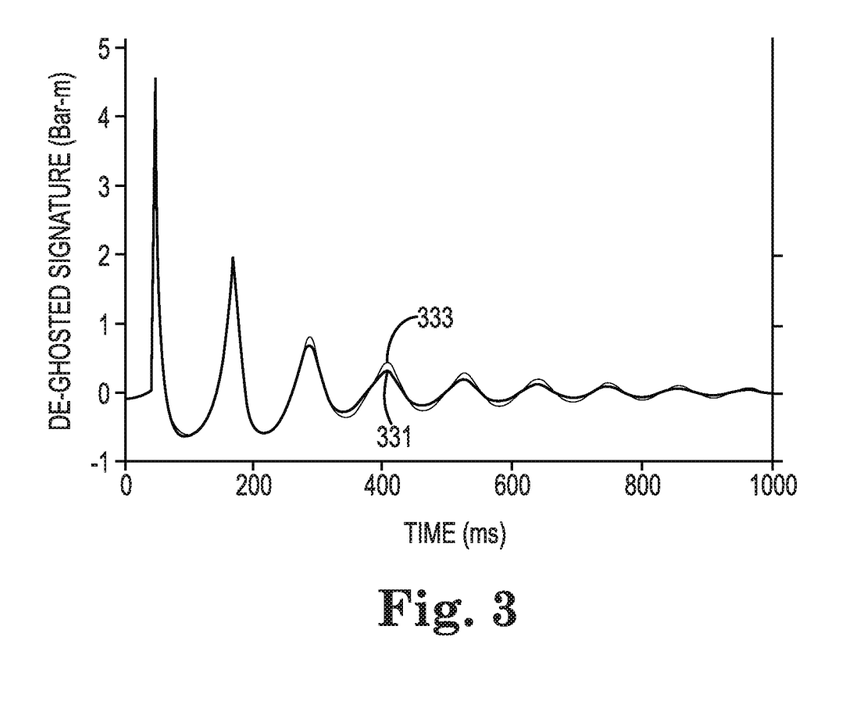
FIG. 3 illustrates a de-ghosted signature as a function of time with a static position and with motion taken into account.

In at least one embodiment, the source signature can be inverted using the positions of the bubbles 225, determined as described herein, to determine a notional source signature and position separately. In contrast, in some approaches in which the motion of the bubble 225 is not taken into account, a notional source signature with errors, as shown in FIG. 3 by curve 331, can be determined.

In a source array, a pressure wavefield can be measured by near-field receivers, such as the near-field receiver 111 illustrated in FIG. 1, placed near each individual impulsive source, such as the impulsive source 126 illustrated in FIG. 1. Besides operational efficiency, some source arrays can be made by design to increase or maximize the output of an impulsive source. This can be done via a plurality of source volumes used in the array to create variation in the bubble oscillation periods between the source elements.

Figure 4:
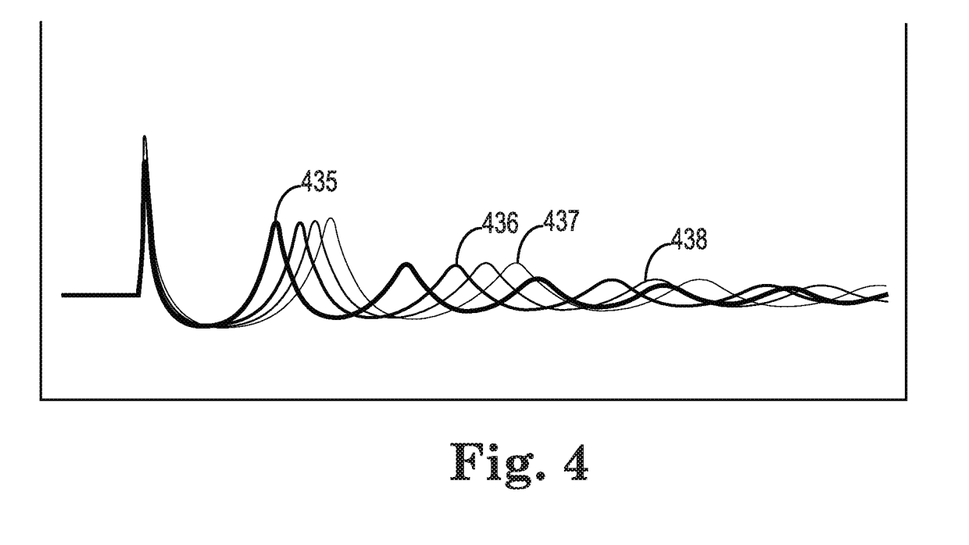
FIG. 4 illustrates peak amplitudes of source signatures from impulsive sources with different chamber volumes.

In at least one embodiment, impulsive sources 226 in the array can be actuated concurrently, such that the primary peaks align constructively in time while subsequent bubble motions can differ in phase. As an example, the subsequent bubble motions may differ in phase depending on the volume of the air that has been released by the individual impulsive sources 226, as illustrated in FIG. 4.

Back-propagation of the signals from the near-field receiver to the bubble positions can include determining relative positions between the bubbles 225 and receivers such as receiver 111 illustrated in FIG. 1. In at least one embodiment, back-propagation of the signals from the near-field receiver to the bubble positions can include precisely determining relative positions between the bubbles 225 and impulsive sources 226 in the array. For instance, knowledge of the movement of the bubbles 225 after they are released in the water can be used in application of a nearfield-to-notional approach. In addition, besides pressure fluctuations due to the relatively short and frequent air supply to the impulsive sources 226, the configuration and the depth of a flexible source array towed by a vessel can change near-continuously from actuation-to-actuation of the impulsive source 226 depending on the towing conditions, sea-state, and sea currents. As opposed to a rigid source array, where source elements are rigidly coupled such that they do not move relative to one another, a flexible source array can include source elements that are flexibly coupled such that they can move relative to one another, particularly when actuated.

In at least one embodiment, the nearfield-to-notional approach can estimate three-dimensional bubble 225 movement as a function of pressure and depth, in addition to the impulsive source volume, from actuation-to-actuation. The source volume is a volume of air discharged when then the impulsive source 226 is actuated. Lateral displacement of the bubble 225 can be calculated using measurements of current direction and strength, which can be provided on an actuation-by-actuation ("shot-by-shot") basis in addition to a bubble coalescence effect, which can be calculated on an actuation-by-actuation basis if the geometry of the source array is known. In at least one embodiment, lateral displacement of the bubble can be inverted provided that the positions of the receiver(s) are determinable.

In at least one embodiment of the present disclosure, a source position and a set of receiver recordings (e.g., hydrophone recordings) and positions in which ghost notches are not overlapping can be used to combine the set of recordings into a single de-ghosted signature. As used herein, a "ghost notch" is a notch occurring at a particular frequency in a recording that arises as a result of a ghost reflection. The amplitude of the ghost notch can be as great as the amplitude of the primary peak. A single-trace de-ghosting may fail at notch frequencies. In near-field measurements, at least one embodiment of the present disclosure can include combining a plurality of recorded sets of data, and can include de-ghosting each recorded trace individually. For a single source/receiver example, a recorded trace T can be the convolution of the notional source N with a ghost operator. In the frequency domain this can be given by Equation 3:

$$T(\omega) = G(\omega)N(\omega). \tag{3}$$

The ghost operator G can be:

$$G(\omega) = \left( \frac{e^{-2\pi i \omega \frac{d_D}{c}}}{d_D} - R \frac{e^{-2\pi i \omega \frac{d_G}{c}}}{d_G} \right) \tag{4}$$

where $d_D$ is the distance between source and receiver, $d_G$ is the distance between the ghost source and receiver, c is the speed of sound in the fluid, and R is the surface reflection coefficient. The ghost source is the position where the signal from the source is reflected as a ghost reflection. In at least one embodiment, R is 1. The notional source (or de-ghosted) signature can be subsequently recovered with:

$$N(\omega) = \frac{\overline{G(\omega)}}{\|G(\omega)\|} T(\omega) \tag{5}$$

which yields a valid result when $d_G$ is a threshold amount smaller than $d_D$.

Within a set of receiver recordings such as hydrophone recordings, each of the recordings can be de-ghosted separately and differences between them can be analyzed. For example, if the bubble position is where it is assumed to be, the difference can be zero (neglecting the noise), while if the bubble position is located somewhere else, a systematic change in the de-ghosted signatures may be observed. If such a change is apparent, the bubble position can be found for a given notional source time sample by reducing the variation of the de-ghosted time sample values at that position as a function of the bubble depth using Equation 1. In at least one embodiment, reducing the variation can comprise minimizing the variation.

In at least one embodiment, an error can be introduced since the position of the ghost source can be taken to be the mirror of the position of the bubble at the same time sample, which may not be correct. However, it may be assumed that the bubble rise velocity is small compared to the velocity of sound, rendering this error negligible. Theoretically, this could be done to all time samples in a trace, but since noise may create errors, at least one embodiment of the present disclosure may be directed to examining bubble peaks with desired signal-to-noise ratios.

For bubbles 225 submerged in water, there can be a plurality of equations giving the rise velocity derived from force balances, depending on the shape and the size of the bubble 225, one example including:

$$U_B = \tfrac{2}{3}\sqrt{gR} \tag{6}$$

For an oscillating bubble 225, the acceleration and drag force can be biggest when the bubble is bigger, and by conservation of momentum, the velocity can be bigger when the bubble 225 is smaller. In at least one embodiment, a rising oscillating bubble can accelerate toward a terminal velocity, as shown in Equation 2.

In at least one embodiment, measured data can include data acquired as part of a calibration of an impulsive source 226. In such an embodiment, nearfield receivers can be positioned directly below the impulsive source 226, at varying vertical distances from the impulsive source 226. For example, a first nearfield receiver can be positioned at a two meter vertical distance below the impulsive source 226 and a second nearfield receiver can be positioned at a three meter vertical distance below the impulsive source 226. A vertical array of receivers located at varying depths can be positioned at a particular horizontal distance from a vessel. For example, at a horizontal distance of five meters from the vessel, a vertical array of receivers can be placed with receiver depths of 4, 6.5, 9, and 13 meters respectively. In addition, a receiver can be placed at a particular depth to provide a far-field reference. As an example, a depth at which a receiver can provide a far-field reference is approximately 70 meters from the impulsive source 226.

FIG. 3 illustrates a de-ghosted signature as a function of time with a static position and with motion taken into account. If the signature was not de-ghosted, it would include ghost notches, which would appear as downward-pointing peaks in addition to the upward-pointing peaks illustrated in FIG. 3). In FIG. 3, curve 333 corresponds to an inverted signature when motion of a bubble generated by actuation of an impulsive source is taken into account, while curve 331 corresponds to a de-ghosted signal as observed by a static nearfield receiver, such as a hydrophone. In at least one embodiment, the static nearfield receiver can be located at a distance of two meters from an impulsive source that generates the signal received by the nearfield receiver.

In at least one embodiment, de-ghosted traces with motion correction can be observed on a receiver-by-receiver basis. A difference in shape of first troughs for the nearfield receivers can be observed, and a difference in amplitude for all receivers after approximately 200 milliseconds can be seen. In at least one embodiment, by reducing the standard deviation of the bubble peaks, estimated bubble depths can be determined. In such an example, after moving upward during the first bubble period, the bubble can reach its terminal velocity in accordance with Equation 2, herein.

In at least one embodiment, a linear interpolation between the estimated depths and the de-ghosted signature where motion is included can be determined. Considering the later part of the signature first, amplitude variations due to noise that are observed in the static case, illustrated by curve 331, can be mitigated or reduced as illustrated by the curve 333.

In at least one embodiment, when considering a far-field signature, the visible effect of the bubble rise can be smaller due to inclusion of the ghost reflection. For example, bubble peaks (e.g., higher order fluctuations in the bubbles as they move through the water) may exhibit a smaller visible effect of the bubble rise since the primary peak may not have experienced any bubble displacement. In at least one embodiment, two de-ghosted signatures can be re-ghosted to the far-field position and compared with the recorded signature at a same position. Re-ghosting can include having the de-ghosted signal reapplied to the de-ghosted signatures. The recorded signature for comparison may have not been used in the de-ghosting process. However, the bubble amplitudes can be better matched when motion correction has been applied.

In at least one embodiment, by estimating and correcting for the effect of a moving bubble, an improved matching far-field signature can be produced. To deduce reliable source signatures based on near-field measurements, a relative motion of the receiver and the bubble can be considered in at least one embodiment to reduce inaccuracies in resulting seismic data.

FIG. 4 illustrates peak amplitudes of source signatures from impulsive sources with different chamber volumes. The primary peak amplitudes for the different signatures are aligned, however the bubble period phases for the different signatures are diverse. Curve 435 corresponds to an impulsive source having a first chamber volume, curve 436 corresponds to an impulsive source having a second chamber volume, curve 437 corresponds to an impulsive source having a third chamber volume, and curve 438 corresponds to an impulsive source having a fourth chamber volume.

Figure 5:
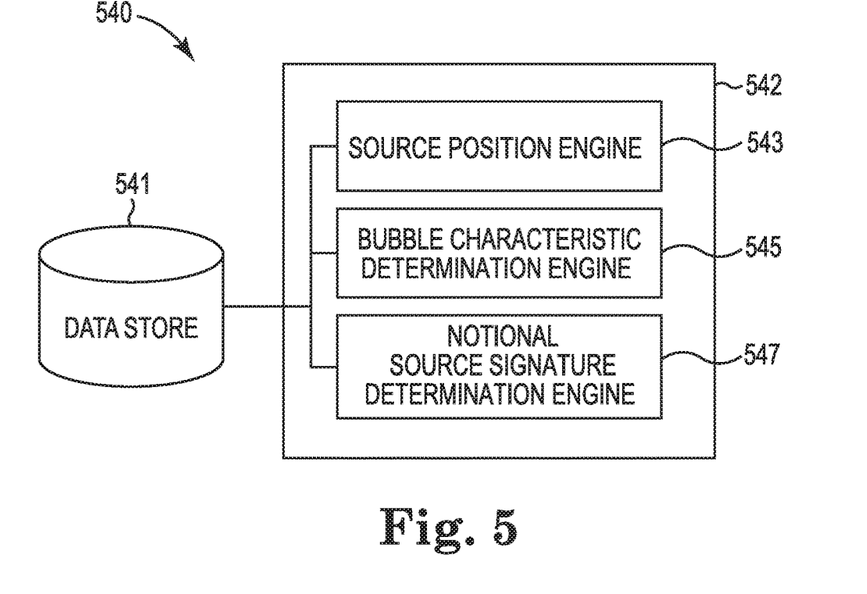
FIG. 5 illustrates a diagram of a system for determination of a notional source signature of a bubble.

FIG. 5 illustrates a diagram of a system for determination of a notional source signature of a bubble. The system 540 can include a data store 541, a subsystem 542, and a number of engines (e.g., source position engine 543, bubble characteristic determination engine 545, and notional source signature determination engine 547) and can be in communication with the data store 541 via a communication link. The system 540 can include additional or fewer engines than illustrated to perform the various functions described herein. The system can represent program instructions and/or hardware of a machine (e.g., machine 650 as referenced in FIG. 6, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, machine-readable medium, etc., as well as hard-wired program such as logic. Hard-wired program instructions can be considered as both program instructions and hardware.

The source position engine 543 can include a combination of hardware and program instructions that is configured to determine a position of an impulsive source. The source position can be determined as described in connection with FIG. 2, herein.

The bubble characteristic determination engine 545 can include a combination of hardware and program instructions that is configured to determine characteristics of a bubble created by actuation of the impulsive source based at least in part on a characteristic of the impulsive source.

The notional source signature determination engine 547 can include a combination of hardware and program instructions that is configured to determine a notional source signature associated with the bubble based at least in part on the determined characteristics of the bubble. In at least one embodiment, the notional source signature determination engine 547 can include a combination of hardware and program instructions that is configured to calculate a wavefield emitted by the bubble at a desired distance and emission angle from the impulsive source based at least in part on the notional source signature and/or recorded data. The recorded can be, for example, recorded near-field data.

Figure 6:
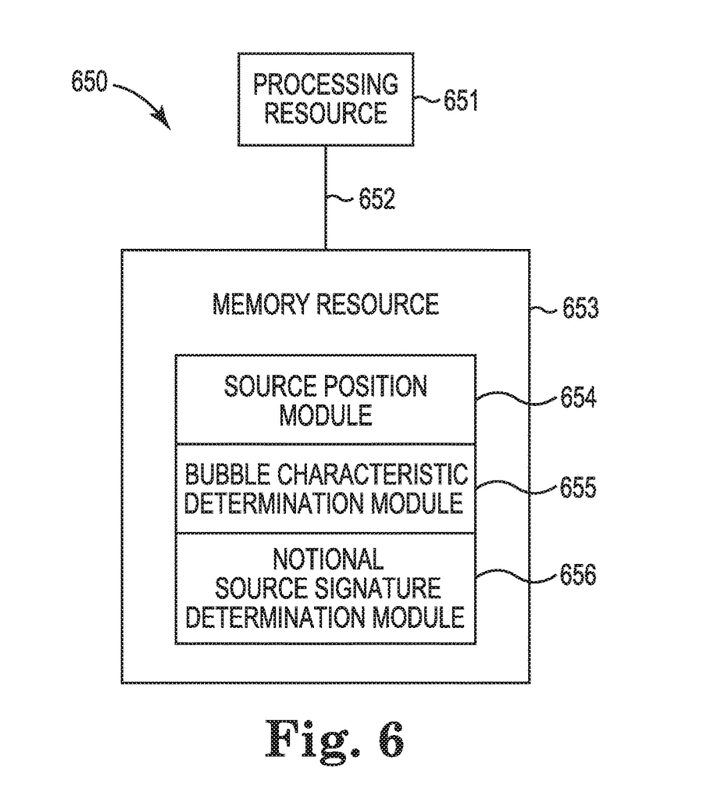
FIG. 6 illustrates a diagram of a machine for determination of a notional source signature of a bubble.

FIG. 6 illustrates a diagram of a machine for determination of a notional source signature of a bubble. The machine 650 can utilize software, hardware, firmware, or logic to perform a number of functions. The machine 650 can be a combination of hardware and program instructions configured to perform a number of functions (e.g., actions). The hardware, for example, can include a number of processing resources 651 and a number of memory resources 653, such as a machine-readable medium or other memory resources 653. The memory resources 653 can be internal or external to the machine 650, for example, the machine 650 can include internal memory resources and have access to external memory resources. The program instructions, such as machine-readable instructions, can include instructions stored on the machine-readable medium to implement a particular function, for example, an action such as determining an estimated direct arrival signal. The set of machine-readable instructions can be executable by one or more of the processing resources 651. The memory resources 653 can be coupled to the machine 650 in a wired or wireless manner. For example, the memory resources 653 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 653 can be non-transitory and can include volatile or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, or a solid state drive, etc., as well as other types of non-transitory machine-readable media.

The processing resources 651 can be coupled to the memory resources 653 via a communication path 652. The communication path 652 can be local or remote to the machine 650. Examples of a local communication path 652 can include an electronic bus internal to a machine, where the memory resources 653 are in communication with the processing resources 651 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 652 can be such that the memory resources 653 are remote from the processing resources 651, such as in a network connection between the memory resources 653 and the processing resources 651. That is, the communication path 652 can be a network connection. Examples of such a network connection can include a local area network, wide area network, personal area network, and the Internet, among others.

As shown in FIG. 6, the machine-readable instructions stored in the memory resources 653 can be segmented into a number of modules 654, 655, 656 that when executed by the processing resources 651 can perform a number of functions. As used herein a module includes a set of instructions included to perform a particular task or action. The number of modules 654, 655, 656 can be sub-modules of other modules. For example, the source position module 654 can be a sub-module of the bubble characteristic determination module 655 or the source position module 654 and the bubble characteristic determination module 655 can be contained within a single module. Furthermore, the number of modules 654, 655, 656 can comprise individual modules separate and distinct from one another. Examples are not limited to the specific modules 654, 655, 656 illustrated in FIG. 6.

Each of the number of modules 654, 655, 656 can include program instructions or a combination of hardware and program instructions that, when executed by a processing resource 651, can function as a corresponding engine as described with respect to FIG. 5. For example, the source position module 654 can include program instructions or a combination of hardware and program instructions that, when executed by a processing resource 651, can function as the source position engine 543. The bubble characteristic determination module 655 can include program instructions or a combination of hardware and program instructions that, when executed by a processing resource 651, can function as the bubble characteristic determination engine 545. The notional source signature determination module 656 can include program instructions or a combination of hardware and program instructions that, when executed by a processing resource 651, can function as the notional source signature determination engine 547.

Figure 7:
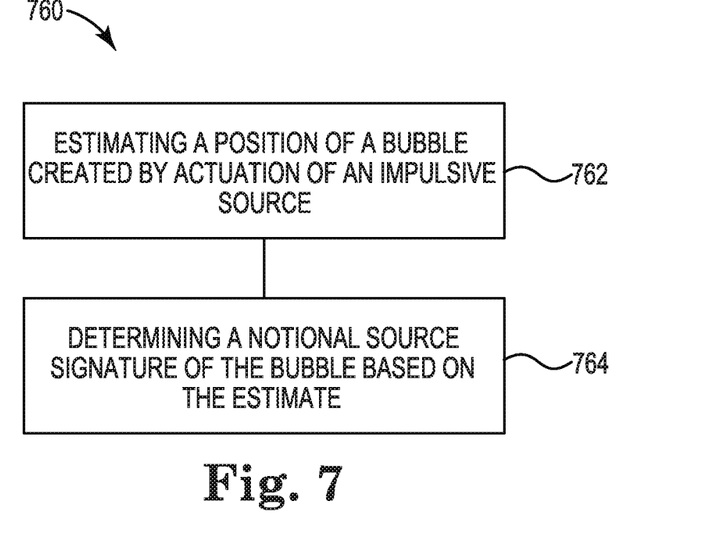
FIG. 7 illustrates a method flow diagram for determination of a notional source signature of a bubble.

FIG. 7 illustrates a method flow diagram for determination of a notional source signature of a bubble. At block 762, the method 760 can include estimating a position of a bubble created by actuation of an impulsive source. The method 760 can include estimating the position of the bubble as a function of time. For example, the position of the bubble can be estimated based at least in part on recorded time samples. For example, the method 7560 can include recording a plurality of time samples associated with the bubbles and using a particular time sample that has a signal-to-noise ratio within a predetermined threshold for estimating the position of the bubble. In at least one embodiment, the signal-to-noise ratio associated with the recorded time sample(s) can be within a particular range or predetermined threshold.

In at least one embodiment, estimating the position of the bubble can include receiving and analyzing a plurality of receiver recordings having non-overlapping ghost notches. The non-overlapping ghost notches can occur at respective frequencies and can be based on a depth of receivers at which the plurality of receiver recordings are received. Further, estimating the position of the bubble can include receiving a plurality of recordings having non-overlapping ghost notches, de-ghosting the plurality of recordings individually, and analyzing differences between the plurality of de-ghosted recordings. The non-overlapping ghost notches can occur at respective frequencies and are based on a depth of receivers at which the plurality of recordings are received.

At block 764, the method 760 can include determining a notional source signature of the bubble based on the estimate. In at least one embodiment, the method 760 can further include determining the notional source signature based on observed propagation characteristics of a signal propagated from the impulsive source to a first position directly from the impulsive source and indirectly via reflection from a sea surface. The method 760 can be beneficially achieved through the use of a machine such as a computer.

The method 760 may further include estimating the position of the bubble by accounting for movement of any of the impulsive source, the bubble, or a receiver based on a recorded signature as a function of time being different for each of the plurality of receivers according to respective positions of each of the plurality of receivers. In at least one embodiment, the method 760 may further include accounting for the movement by accounting for movement based on a difference in amplitude in the recorded signature for each of the plurality of receivers.

Figure 8:
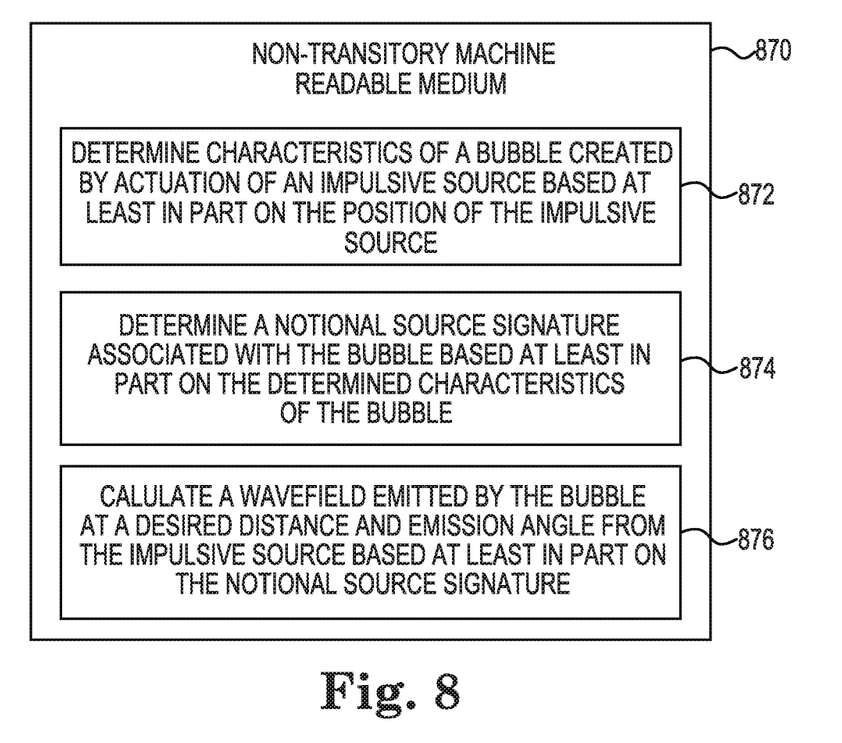
FIG. 8 illustrates a non-transitory machine-readable medium storing instructions executable by a processing resource for determination of a notional source signature of a bubble.

FIG. 8 illustrates a non-transitory machine-readable medium storing instructions executable by a processing resource for estimation of characteristics of a bubble. A computer processor (e.g., a hardware processing resource) can execute instructions stored on the non-transitory machine readable medium 870. The non-transitory machine-readable medium 870 may be any type of volatile or non-volatile memory or storage, such as random access memory (RAM), flash memory, read-only memory (ROM), storage volumes, a hard disk, or a combination thereof.

At 872, the non-transitory machine-readable medium 870 can include instructions executable to determine characteristics of a bubble created by actuation of the impulsive source based at least in part on the position of the impulsive source. In at least one embodiment, the non-transitory machine-readable medium 870 can include instructions executable to estimate a position of the bubble as a function of time based at least in part on the position of the impulsive source and the characteristics of the bubble. The non-transitory machine-readable medium 870 can further include instructions executable to determine a position of the bubble based on a volume of air discharged by actuation of the impulsive source.

Characteristics of the bubble can include a pressure inside the bubble and a pressure outside the bubble or an estimate of a vertical position of the bubble and a horizontal position of the bubble as a function of time. In at least one embodiment, the non-transitory machine-readable medium 870 can include instructions executable to determine a rise profile of the bubble based on a volume of air discharged by the impulsive source, a pressure exerted by the volume of air discharged, and a depth from a sea surface of the impulsive source.

At 874, the non-transitory machine-readable medium 870 may include instructions executable to determine a notional source signature associated with the bubble based at least in part on the determined characteristics of the bubble. In at least one embodiment, the non-transitory machine-readable medium 870 can include instructions executable to determine the notional source signature based at least in part on a near-field signal associated with the impulsive source.

At 876, the non-transitory machine-readable medium 870 can include instructions executable to calculate a wavefield emitted by the bubble at a desired distance and emission angle from the impulsive source based, at least in part, on the notional source signature.

In accordance with a number of embodiments of the present disclosure, a geophysical data product may be produced. The geophysical data product may include, for example, field data recorded during a survey utilizing the above-described techniques. Geophysical data may be obtained and stored on a non-transitory, tangible computer-readable medium. In some instances, once onshore in the United States, geophysical analysis may be performed on the geophysical data product. In some instances, geophysical analysis may be performed on the geophysical data product offshore according to techniques described herein or known in the art, and stored on a computer-readable medium, to produce an enhanced geophysical data product.

As used herein, the term "and/or" includes any and all combinations of a number of the associated listed items. As used herein the term "or," unless otherwise noted, means logically inclusive or. That is, "A or B" can include (only A), (only B), or (both A and B). In other words, "A or B" can mean "A and/or B" or "one or more of A and B."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    estimating a position of a bubble created by actuation of an impulsive source by:
        receiving a plurality of recordings having non-overlapping ghost notches;
        de-ghosting the plurality of recordings; and
        analyzing differences between a plurality of de-ghosted recordings, wherein the non-overlapping ghost notches occur at respective frequencies and are based on a depth of receivers at which the plurality of recordings are received; and
    determining a notional source signature of the bubble based on the estimate.

2. The method of claim 1, wherein estimating the position of the bubble further comprises estimating the position of the bubble as a function of time.

3. The method of claim 1, wherein estimating the position of the bubble comprises:
    de-ghosting the plurality of recordings individually.

4. The method of claim 1, wherein analyzing the differences between the plurality of de-ghosted recordings comprises minimizing variation of the plurality of de-ghosted recordings as a function of a depth of the bubble.

5. The method of claim 1, wherein estimating the position of the bubble further comprises:
    recording a plurality of time samples associated with the bubble; and using a particular time sample that has a signal-to-noise ratio within a predetermined threshold for estimating the position of the bubble.

6. The method of claim 1, wherein estimating the position of the bubble is given by $$z_{Estimate}(\tau) = \min_z \left[ \sum_T N_T(\tau)^2 - \left( \sum_T N_T(\tau) \right)^2 \right],$$

wherein $z_{Estimate}(\tau)$ is the estimated vertical position of the bubble as a function of time, $\tau$ is a recorded time sample, $N_T$ is a recorded de-ghosted source signature, and T is a set of receivers configured to receive a signal propagated from the bubble.

7. The method of claim 1, further comprising:
determining a relative position between the bubble and an impulsive source; and
back-propagating a signal from a receiver to the impulsive source based, at least in part on the relative position between the bubble and the impulsive source.

8. A method of generating a geophysical data product, the method comprising:
obtaining geophysical data;
processing the geophysical data to generate the geophysical data product, wherein processing the geophysical data comprises:
estimating a position of a bubble created by actuation of an impulsive source by:
receiving a plurality of recordings having non-overlapping ghost notches;
de-ghosting the plurality of recordings; and
analyzing differences between the plurality of de-ghosted recordings, wherein the non-overlapping ghost notches occur at respective frequencies and are based on a depth of receivers at which the plurality of recordings are received; and
determining a notional source signature of the bubble based on the estimate.

9. The method of claim 8, wherein processing the geophysical data comprises processing the geophysical data offshore or onshore.

10. The method of claim 8, wherein de-ghosting the plurality of recordings further comprises de-ghosting the plurality of recordings individually.

11. A method, comprising:
estimating a position of a bubble created by actuation of an impulsive source;
determining a relative position between the bubble and the impulsive source;
back-propagating a signal from a receiver to the impulsive source based, at least in part on the relative position between the bubble and the impulsive source; and
determining a notional source signature of the bubble based on the estimate.

12. The method of claim 11, wherein estimating the position of the bubble further comprises estimating the position of the bubble as a function of time.

13. The method of claim 11, wherein estimating the position of the bubble further comprises:
recording a plurality of time samples associated with the bubble; and
using a particular time sample that has a signal-to-noise ratio within a predetermined threshold for estimating the position of the bubble.

14. The method of claim 11, further comprising:
determining a relative position between the bubble and an impulsive source; and
back-propagating a signal from a receiver to the impulsive source based, at least in part on the relative position between the bubble and the impulsive source.

15. A method of generating a geophysical data product, the method comprising:
obtaining geophysical data;
processing the geophysical data to generate the geophysical data product, wherein processing the geophysical data comprises:
estimating a position of a bubble created by actuation of an impulsive source;
determining a relative position between the bubble and the impulsive source;
back-propagating a signal from a receiver to the impulsive source based, at least in part on the relative position between the bubble and the impulsive source; and
determining a notional source signature of the bubble based on the estimate.

16. The method of claim 15, wherein processing the geophysical data comprises processing the geophysical data offshore or onshore.

* * * * *